(12) United States Patent
Jelenkovic et al.

(10) Patent No.: US 10,959,418 B2
(45) Date of Patent: Mar. 30, 2021

(54) AUTOMATIC APPLICATION RATE AND SECTION CONTROL BASED ON ACTUAL PLANTING DATA

(71) Applicant: CNH Industrial America LLC, New Holland, PA (US)

(72) Inventors: Bojan Jelenkovic, Joliet, IL (US); Matthew K Payne, Plainfield, IL (US); Steven Sobieszek, Addison, IL (US)

(73) Assignee: CNH Industrial America LLC, New Holland, PA (US)

(*) Notice: Subject to any disclaimer, the term of this patent is extended or adjusted under 35 U.S.C. 154(b) by 197 days.

(21) Appl. No.: 16/157,440

(22) Filed: Oct. 11, 2018

(65) Prior Publication Data
US 2020/0113169 A1  Apr. 16, 2020

(51) Int. Cl.
| | | |
|---|---|---|
| *A01M 7/00* | (2006.01) |
| *A01C 23/00* | (2006.01) |
| *A01B 76/00* | (2006.01) |
| *B60K 35/00* | (2006.01) |
| *A01B 79/00* | (2006.01) |

(52) U.S. Cl.
CPC ........... *A01M 7/0089* (2013.01); *A01B 76/00* (2013.01); *A01B 79/005* (2013.01); *A01C 23/007* (2013.01); *B60K 35/00* (2013.01); *B60K 2370/1438* (2019.05)

(58) Field of Classification Search
None
See application file for complete search history.

(56) References Cited

U.S. PATENT DOCUMENTS

| | | | |
|---|---|---|---|
| 5,809,440 A | 9/1998 | Beck et al. | |
| 5,915,313 A | 6/1999 | Bender et al. | |
| 5,931,882 A * | 8/1999 | Fick ..................... | A01B 79/005 701/50 |
| 6,070,539 A | 6/2000 | Flamme et al. | |
| 6,671,698 B2 * | 12/2003 | Pickett ................ | A01B 79/005 |
| 6,941,225 B2 | 9/2005 | Upadhyaya et al. | |
| 6,963,881 B2 * | 11/2005 | Pickett ................ | A01B 79/005 |

(Continued)

FOREIGN PATENT DOCUMENTS

RU           2472334 C1 *  1/2013

OTHER PUBLICATIONS

Raven Industries, Raven Precision, Raven Rate Control Module, https://ravenprecision.com/products/field-computers, retrieved on Nov. 21, 2017, pp. 1-4.

(Continued)

*Primary Examiner* — Shelley Chen
(74) *Attorney, Agent, or Firm* — Rebecca L. Henkel; Rickard K. De Mille

(57) ABSTRACT

A system, an apparatus and a method for automatically controlling application of an agricultural product utilize an in-cab controller and touchscreen, and a GPS receiver to generate an application prescription and related commands on-the-fly from GPS coordinated data gathered at the time of planting, in accordance with application rate parameters stored in the controller. The application parameters may be provided and modified on-the fly using the touchscreen and may include parameters relating to adjusting application rates to accommodate planting arrangements including more than one variety of seed, and/or variable population rates of planted seed.

18 Claims, 5 Drawing Sheets

(56) References Cited

U.S. PATENT DOCUMENTS

| | | | |
|---|---|---|---|
| 7,142,966 B2* | 11/2006 | Saller | A01B 79/005 701/50 |
| 7,146,230 B2 | 12/2006 | Glanzer et al. | |
| 7,395,769 B2* | 7/2008 | Jensen | A01C 7/00 111/121 |
| 8,386,129 B2 | 2/2013 | Collins et al. | |
| 8,401,704 B2 | 3/2013 | Pollock et al. | |
| 9,113,590 B2 | 8/2015 | Johnson | |
| 9,338,938 B2* | 5/2016 | Cash | A01C 21/00 |
| 9,767,521 B2 | 9/2017 | Stuber et al. | |
| 9,781,874 B2* | 10/2017 | Johnson | G06Q 10/06315 |
| 9,804,608 B2* | 10/2017 | Chahley | A01C 21/005 |
| 9,813,512 B2 | 11/2017 | Wilbur et al. | |
| 9,983,311 B2* | 5/2018 | McPeek | G01C 21/165 |
| 2003/0182144 A1* | 9/2003 | Pickett | A01B 79/005 705/317 |
| 2003/0182259 A1* | 9/2003 | Pickett | G06Q 10/06 |
| 2003/0182260 A1* | 9/2003 | Pickett | G06Q 10/06 |
| 2004/0088330 A1* | 5/2004 | Pickett | G06Q 10/06 |
| 2004/0237394 A1* | 12/2004 | Mayfield | A01C 21/007 47/58.1 FV |
| 2006/0086295 A1* | 4/2006 | Jensen | A01C 7/00 111/118 |
| 2014/0002489 A1 | 1/2014 | Sauder et al. | |
| 2014/0277959 A1* | 9/2014 | Wagers | A01C 21/005 701/50 |
| 2014/0345340 A1 | 11/2014 | Holland | |
| 2016/0044858 A1* | 2/2016 | Johnson | A01C 21/00 701/50 |
| 2016/0044862 A1* | 2/2016 | Kocer | A01C 23/00 111/118 |
| 2016/0120097 A1* | 5/2016 | Chahley | A01C 21/005 701/50 |
| 2017/0112047 A1* | 4/2017 | Johnson | A01C 7/00 |
| 2018/0192577 A1* | 7/2018 | Smith | A01C 7/20 |
| 2018/0359909 A1* | 12/2018 | Conrad | A01C 23/02 |
| 2019/0205610 A1* | 7/2019 | Muehlfeld | G06K 9/0063 |
| 2020/0037519 A1* | 2/2020 | Wonderlich | B05B 12/085 |
| 2020/0090372 A1* | 3/2020 | Reusch | G06T 7/90 |

OTHER PUBLICATIONS

Humburg, Daneil, Site Specific Management Guidelines, Vairable Rate Equipment—Technology for Weed Control, http://www/ipni.net/publication/ssmg.nsf/0/F05D57E27B039458852579E5007671F1/$FILE/SSMG-07.pdf, retrieved on Nov. 21, 2017, pp. 1-4.

Perez-Ruiz, Manuel, Weeding Out, Weed Management—GNSS for Precision Farming, https://www.geospatialworld.net/article/weeding-out/, retrieved on Nov. 21, 2017, pp. 1-2.

* cited by examiner

AUTOMATIC APPLICATION RATE AND SECTION CONTROL BASED ON ACTUAL PLANTING DATA

FIELD OF THE INVENTION

The present invention pertains to the application of an agricultural product to a planted agricultural field and, more specifically, to automatic on-the-fly adjustment of application rates of the agricultural product during application, based on GPS coordinated planting data previously recorded at the time the field was planted.

BACKGROUND OF THE INVENTION

Modern agricultural practices rely on timely and accurate applications of agricultural products, such as fertilizer, insecticide, fungicide, weed control agents, and the like.

In the past, crops were planted in an essentially uniform manner, using only one variety of seed, across a given field. An application rate for a subsequently applied agricultural product was selected and applied uniformly to the entire field. Typically, the application rate was entered manually into a control unit adapted for controlling the applicator as the applicator was subsequently moved across the field by a propulsion vehicle.

Alternatively, a so called "prescription" for uniform application of the agricultural product at a fixed rate across the field was worked out in advance, using GPS coordinated planting data recorded at the time of planting the crop in the field and soil test data. The prescription was then provided as a data input to the applicator control unit, or it was manually entered into the applicator controller by an operator prior to beginning application of the agricultural product.

With these and other prior approaches, once the uniform, fixed application rate was entered into the applicator controller options for modifying during application of the product were limited. Operators typically had some ability to manually modify the application rate as the applicator moved across the field, to fine-tune the fixed application rate, but such manual alterations typically affected the entire swath of the field to which the agricultural product was presently being applied by the applicator. The application rate typically then stayed at the modified rate for the remainder of the application operation, unless the operator again manually modified the application rate.

Such prior practices generally provided satisfactory results for a single variety of seed planted uniformly across the field, but they were wasteful in that the uniform application rates resulted in wasteful overapplication of the agricultural product in some areas of the field, and potential loss of yield due to underapplication of the agricultural product in other areas of the field. Such prior practices also required a substantial input of operator energy and skill, particularly where continual manual modifications were used to tailor the application rate to better match actual field and crop conditions.

Today, modern planting equipment is capable of varying a number of parameters, such as planting population or spacing, and changing between multiple varieties across a given area of a field or even in the same row, to improve yield and profitability by optimizing the placement of seed to match soil fertility and other factors. Modern planting equipment has the capacity to record GPS cross-referenced data relating to the placement and spacing of seeds and varieties planted, as the crop is planted. Gaps in rows or areas of the planting area are also typically recorded.

These additional capabilities of planting equipment have substantially increased the number of variables involved in the application of agricultural products subsequent to planting, and also provide a wider variety of potential options for tailoring application of the placement and application rate of the agricultural products across the field. Prior approaches to making manual adjustments cannot realistically be used to adjust for all of these additional variables and take advantage of such a wide range of potential options for more effectively and efficiently placing the agricultural product where it will result in optimal crop production in the field.

Although some of these additional variables and options could conceivably be factored into a more complex prescription prior to heading for the field to apply the agricultural product, such complex pre-application preparation of a prescription for a field is time consuming and limited by the assumption that the actual conditions of the crop in the field are as intended at the time of planting. Such complex pre-application prescriptions are also prepared using average, or standardized application rate data for the agricultural product to be applied, and they may not be tailored to the particular operating parameters of the application equipment available for use when the product needs to be applied for optimal effect.

Subsequent to planting, development of wet areas due to rainfall, flooding, or drainage tile problems may have affected the actual standing crop. Other factors such as unusually high or low insect or weed infestations, or problems with unanticipated plant diseases, defective seed, or problems with planting equipment cannot always be accounted for in pre-prepared prescriptions, and they may not be recognized until the applicator is in the field.

In light of these and other limitations, reliance on pre-prepared prescriptions that are complex enough to effectively and efficiently take advantage of all of the variables and options provided by modern planting techniques is not an acceptably reliable or realistic approach.

It is desirable, therefore, to provide a new system, method and apparatus for automatically varying parameters such as the application rate and control of sections or individual nozzles of equipment applying agricultural products, on-the-fly, while in the field, as a function of the data recorded at the time of planting. It is also desirable to automatically vary application rates and positioning of the agricultural product as a function of previously recorded GPS coordinated planting data indicating actual plant population, variety, gaps, etc., and as a function of GPS-referenced present position of the application equipment in the field. It is further desirable to provide for on-the-fly, in-cab adjustments to, and/or scaling of application parameters to further modify application rates and placement of the agricultural product, while in the field.

SUMMARY OF THE INVENTION

The invention provides an improved system, apparatus and method for controlling application of an agricultural product through use of an in-cab controller and touchscreen, and a GPS receiver, to generate an application prescription and related application instructions or commands on-the-fly, from GPS coordinated data gathered at the time of planting, in accordance with application rate parameters stored in the controller. The application parameters may be provided and/or modified on-the fly using the touchscreen and may include parameters relating to adjusting application rates to accommodate planting arrangements incorporating more than one variety of seed, and/or variable population rates of planted seed.

In one form of the invention, an in-cab applicator control system is provided for automatically controlling an application rate of an agricultural product by a mobile agricultural product applicator as a function GPS coordinated planting data showing seed placement and GPS data recorded at the time of planting a crop of the seed in a field.

The applicator control system may include a controller and a touchscreen mountable in the cab of a propulsion vehicle configured for moving the applicator across a planted field, and a GPS receiver operatively connected for providing a present position of the applicator to the controller. The controller may be operatively connected to the touchscreen and the GPS receiver for exchanging information and instructions with the touchscreen and GPS receiver.

The controller and the touchscreen may be configured for automatically generating and modifying an application prescription and related instructions for controlling the applicator on-the-fly during application of the agricultural product. The prescription may be generated from the GPS coordinated data gathered at the time of planting, in accordance with application rate modification parameters stored in the controller, to thereby automatically vary application rates of the agricultural product being applied by the applicator in accordance with the prescription as the applicator is moved across the field by the propulsion vehicle.

In some forms of a control system according to the invention, at least one application parameter may be provided from the cab using the touchscreen. At least one application parameter may be modifiable on-the-fly using the touchscreen. The application parameters may include a parameter relating to adjustment of the application rate of the agricultural product to correspond with a desired application rate specific to each of at least two different seed varieties, and/or a parameter relating to adjustment of the application rate the of agricultural to correspond with a desired application rate specific to each of at least two different population rates of planted seed.

Some forms of a controller, according to the invention, may include a planting data storage register, an application rate storage register, an application parameter storage register an input output (I/O) arrangement and a processor. The processor is operatively connected for exchanging information between the GPS receiver, the planting data storage register, the application rate storage register, the application parameter storage register, the touchscreen and the I/O arrangement.

The planting data storage register is configured for receiving and storing GPS coordinated planting data that was recorded at the time of planting the crop. The application rate data storage register is configured for storing a prescription including instructions for controlling the agricultural product applicator as a function of the current position of the applicator in the field. The application parameter data storage register is configured for receiving and storing application parameters related to preparing the application rate data instructions of the prescription from the planting data, and the input/output (I/O) arrangement is adapted for exchanging information with the applicator.

The processor is configured for processing the GPS coordinated planting data in accordance with instructions stored in the application parameters data storage register to generate a set of instructions linked to the GPS coordinated planting data in the application rate data register, to thereby generate the prescription, and then store the prescription in the application rate data storage register. The processor may also be configured for providing a visual display of the set of application instructions and the present position of the applicator on the touchscreen. The processor is further configured for supplying the application instructions to the applicator via the I/O arrangement as a function of the present position of the applicator.

The application parameters stored in the application parameter storage register may include a parameter for selecting an application rate of the agricultural product as a function of the variety of seed planted. The processor and touchscreen may be configured such that application rates for two or more varieties of seed are entered via the touchscreen into a table in the application parameter data register.

The application parameters stored in the application parameter storage register may include a parameter for selecting an application rate of the agricultural product as a function of the seed population rate. The processor and touchscreen may be configured such that application rates for two or more seed population rates are entered into a table stored in the application parameter data register. The application rates for the two or more seed population rates may be entered into the table via the touchscreen. The processor may be configured for computing an application rate as a function of a seed population rate of the planting data in accordance with a scaling equation stored in the application rate parameter data register.

The invention may take the form of a mobile agricultural product application apparatus for applying an agricultural product to a field at an application rate according to an application rate prescription generated on-the-fly by the application apparatus from GPS coordinated planting data recorded at the time of planting a crop in the field. Such an agricultural product application apparatus may include an applicator that is adapted for operative connection to a propulsion vehicle configured for operatively moving the applicator across the field during application of the agricultural product by the applicator, and an applicator control system according to the invention.

In a mobile agricultural product application apparatus according to the invention, the applicator may include two or more individually controllable product application nozzles, and the application rate prescription generated by the controller from the planting data and provided to the applicator through the I/O arrangement may include instructions for individually controlling each of the two or more individually controllable product application nozzles. Where the applicator includes multiple nozzles arranged in two or more sections, the mobile agricultural product apparatus may be configured for providing individual control of the flow rate of agricultural product provided by each section.

The invention may also take the form of a method for automatically controlling the application of an agricultural product to a field by an agricultural product application apparatus having an applicator adapted for operative attachment to a propulsion vehicle having a cab. Such a method may include utilizing an in-cab controller and touchscreen, and a GPS receiver to generate an application prescription and related commands on-the-fly from GPS coordinated planting data gathered at the time of planting a crop of seed in the field, in accordance with application rate parameters stored in the controller. Such a method may also include: recording the GPS coordinated planting data while planting the crop of seed in a field; storing the GPS coordinated planting data in the in-cab controller of the propulsion vehicle; inputting and storing application parameters in the in-cab controller; generating a prescription including two or more GPS coordinated application rates, and storing the prescription in the controller; and, controlling the placement and application rate of the agricultural product applied by the applicator in accordance with the prescription and a present GPS position of the applicator from the GPS receiver as the application apparatus moves through the field.

A method, according to the invention may include: inputting at least one application parameter for generating the prescription from the planting data via the in-cab touchscreen; and/or inputting at least one application parameter for modifying the prescription via the in-cab touchscreen on-the-fly while the application apparatus is in the field.

A method, according to the invention may further include storing the GPS coordinated planting data in the planting data storage register, storing at least one application parameter in the application parameter data storage register, generating and storing the application instructions of the prescription in the application rate storage register, providing a visual display on the touchscreen, and supplying the application instructions to the applicator via the I/O arrangement as function of the present position of the applicator.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
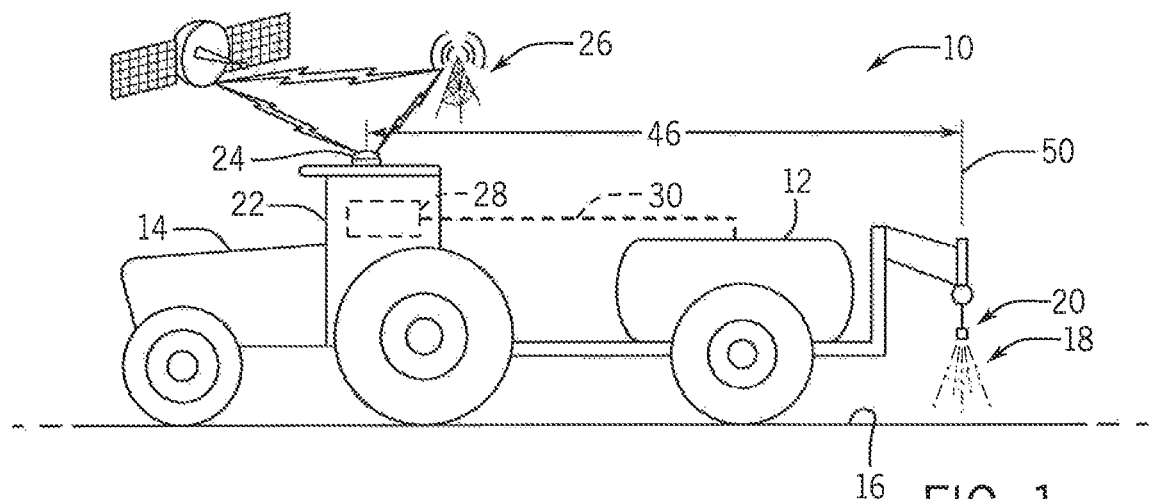
FIG. 1 illustrates a plan view of a first exemplary embodiment of an application apparatus, including an applicator pulled by a tractor, in accordance with an exemplary embodiment of the present invention.
Figure 2:
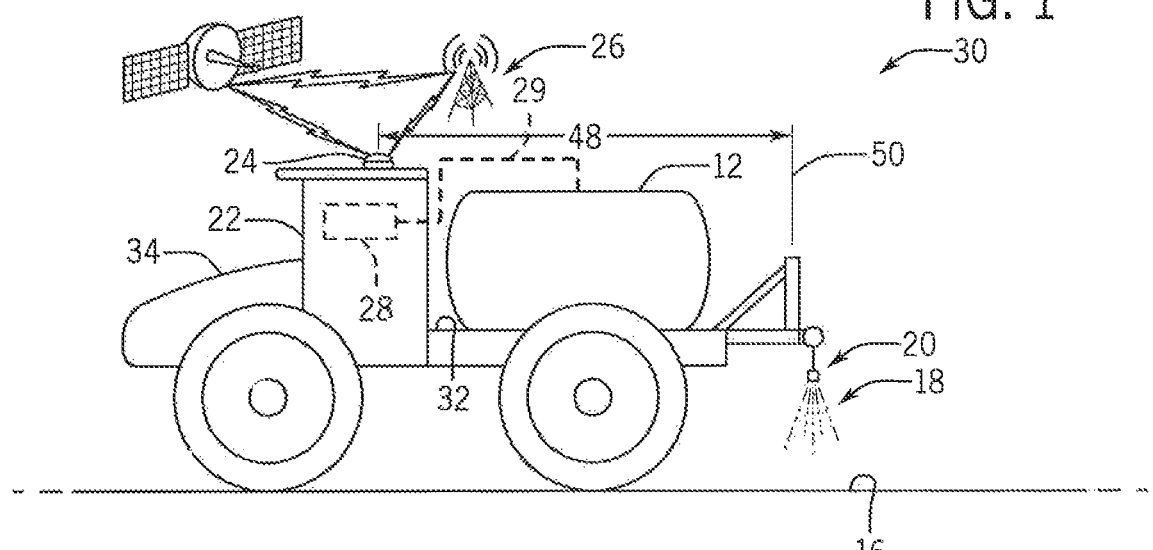
FIG. 2 illustrates a plan view of a second exemplary embodiment of an application apparatus, including an applicator mounted on a self-propelled propulsion vehicle, in accordance with an exemplary embodiment of the present invention.

FIGS. 1 and 2 respectively depict first and second exemplary embodiments of mobile agricultural product apparatuses 10,30, in accordance with the invention. For simplicity of explanation and understanding, like reference numbers will be used where practical in in the descriptions below for describing similar elements of the first and second exemplary embodiments of the mobile agricultural product apparatuses 10,30.

The first exemplary embodiment of the mobile agricultural product application apparatus 10 includes a towable applicator 12 that is adapted for operative connection to a propulsion vehicle in the form of a tractor 14 that is configured for operatively moving the applicator 12 across the field 16 during application of a liquid agricultural product 18 by a series of spray nozzles 20 the applicator 12. The tractor 14 includes a cab 22 for an operator, and a positioning system that includes a GPS or GNSS receiver 24 mounted on the cab 22 for receiving signals from a GPS or GNSS satellite positioning system 26 that is used for determining a present position of the tractor 14 in the field 16.

As further illustrated by dashed lines in FIG. 1, the first exemplary embodiment of the mobile application apparatus 10 also includes an applicator control system 28 that is mounted in the cab 22 of the tractor 14 and connected via a data bus 29 to the applicator 12. As described in more detail below, the applicator control system 28 is configured for controlling the applicator 12 during application of the agricultural product 18 in accordance instructions of an application rate prescription generated in the tractor cab 22 by the applicator control system 28, in a manner that allows the prescription to be conveniently automatically generated and/or modified on-the-fly from the tractor cab 22 while the mobile application apparatus 10,30 is traversing the field 16.

The first exemplary embodiment of the mobile agricultural product application apparatus 10 includes a towable applicator 12 that is adapted for operative connection to a propulsion vehicle in the form of a tractor 14 configured for operatively moving the applicator 12 across the field 16 during application of a liquid agricultural product by the spray nozzles 20 the applicator 12. The tractor 14 includes a cab 22 for an operator, and a positioning system that includes a GPS or GNSS receiver 24 mounted on the cab 22 for receiving signals from a GPS or GNSS satellite positioning system 26 that is used for determining a present position of the tractor 14 in the field 16.

As further illustrated by dashed lines in FIG. 1, the first exemplary embodiment of the mobile application apparatus 10 also includes an applicator control system 28 that is mounted in the cab 22 of the tractor 14 and connected via a data bus 29 to the applicator 12. As described in more detail below, the applicator control system 28 is configured for controlling the applicator 12 during application of the agricultural product 18 in accordance instructions of an application rate prescription generated in the tractor cab 22 by the applicator control system 28, in a manner that allows the prescription to be conveniently automatically generated and/ or modified on-the-fly from the tractor cab 22 while the mobile application apparatus 10 is traversing the field 16.

As will be understood from FIG. 2, the second exemplary embodiment of the mobile agricultural product application apparatus 30 differs only slightly from the from the first exemplary embodiment 10, in that the applicator 12 is adapted for operative connection and mounting on a bed 32 of a propulsion vehicle 34 that is configured for operatively moving the applicator 12 across the field 16 during application of a liquid agricultural product by the spray nozzles 18 the applicator 12. The propulsion vehicle 34 includes a cab 22 for an operator, and a positioning system that includes a GPS or GNSS receiver 24 mounted on the cab 22 for receiving signals from a GPS or GNSS satellite positioning system 26 that is used for determining a present position of the tractor 14 in the field 16.

As further illustrated by dashed lines in FIG. 2, the second exemplary embodiment of the mobile application apparatus 30 also includes an applicator control system 28 that is mounted in the cab 22 of the propulsion vehicle 34 and connected via a data bus 29 to the applicator 12. As described in more detail below, the applicator control system 28 is configured for controlling the applicator 12 during application of the agricultural product 18 in accordance instructions of an application rate prescription generated in the tractor cab 22 by the applicator control system 28, in a manner that allows the prescription to be conveniently automatically generated and/or modified on-the-fly from the cab 22 of the propulsion vehicle 34 while the mobile application apparatus 30 is traversing the field 16.

The invention utilize GPS coordinated planting data that is recorded at the time of planting seed for a crop in the field 16.

Figure 3:
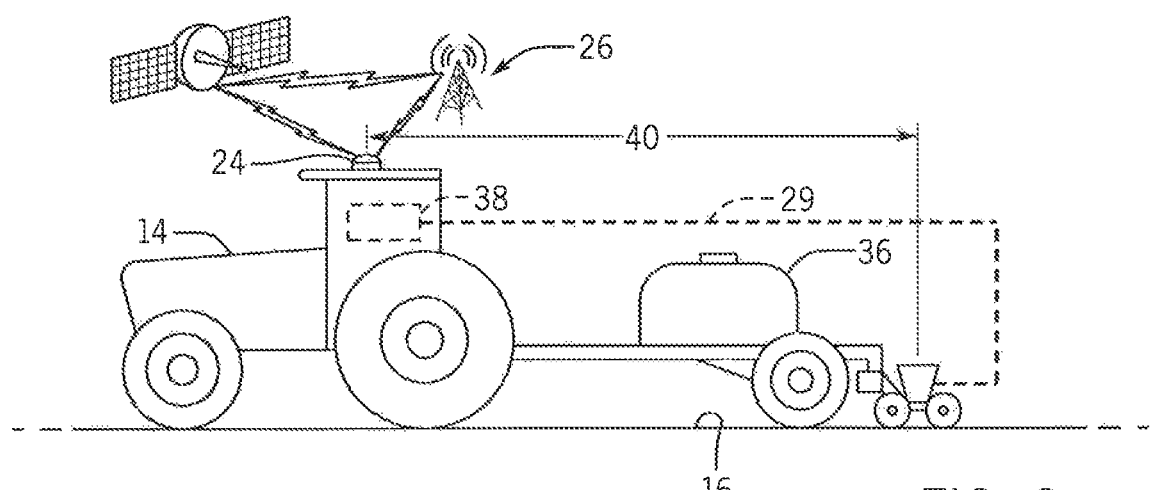
FIG. 3 illustrates a plan view of an exemplary embodiment of tractor pulling a planter and recording GPS coordinated planting data as a crop is planted, in accordance with an exemplary embodiment of the present invention.

As shown in FIG. 3, as the crop is planted by a planter 36 being drawn by the tractor 14 across the field 16, the planter 36 provides detailed data relating to seed placement and variety to an on-board computer 38 in the tractor 10, via the data bus 29. The on-board computer 38 compiles and coordinates the data generated by the planter 36 with present position data from the GPS or GNSS system 26 received at the GPS receiver 24 as the crop is being planted, and creates a GPS coordinated planting data file that is stored in the on-board computer 38. As will be appreciated from an examination of FIG. 2, the seed being planted by the planter 36 is actually deposited into the soil of the field 16 at an offset distance 40 from the GPS receiver 24 mounted on the tractor 14. The on-board computer 38 compensates for this offset 40 when compiling the GPS coordinated planting data.

In embodiments of the invention where the same propulsion vehicle is used for pulling the planter 36 and the applicator 12, as illustrated in FIGS. 1 and 3, the GPS coordinated planting data may be readily transferred directly from the on-board computer 38 to the control system 28. Where different propulsion vehicles are used for pulling the planter 36 and moving the applicator 12 across the planted field 16 during application of an agricultural product in the manner illustrated in FIGS. 2 and 3, the GPS coordinated planting data is transferred from the on-board computer 38 to the control system 28 by any appropriate conventional Internet or wireless means, or through use of conventional transportable physical electronic memory devices.

Figure 4:
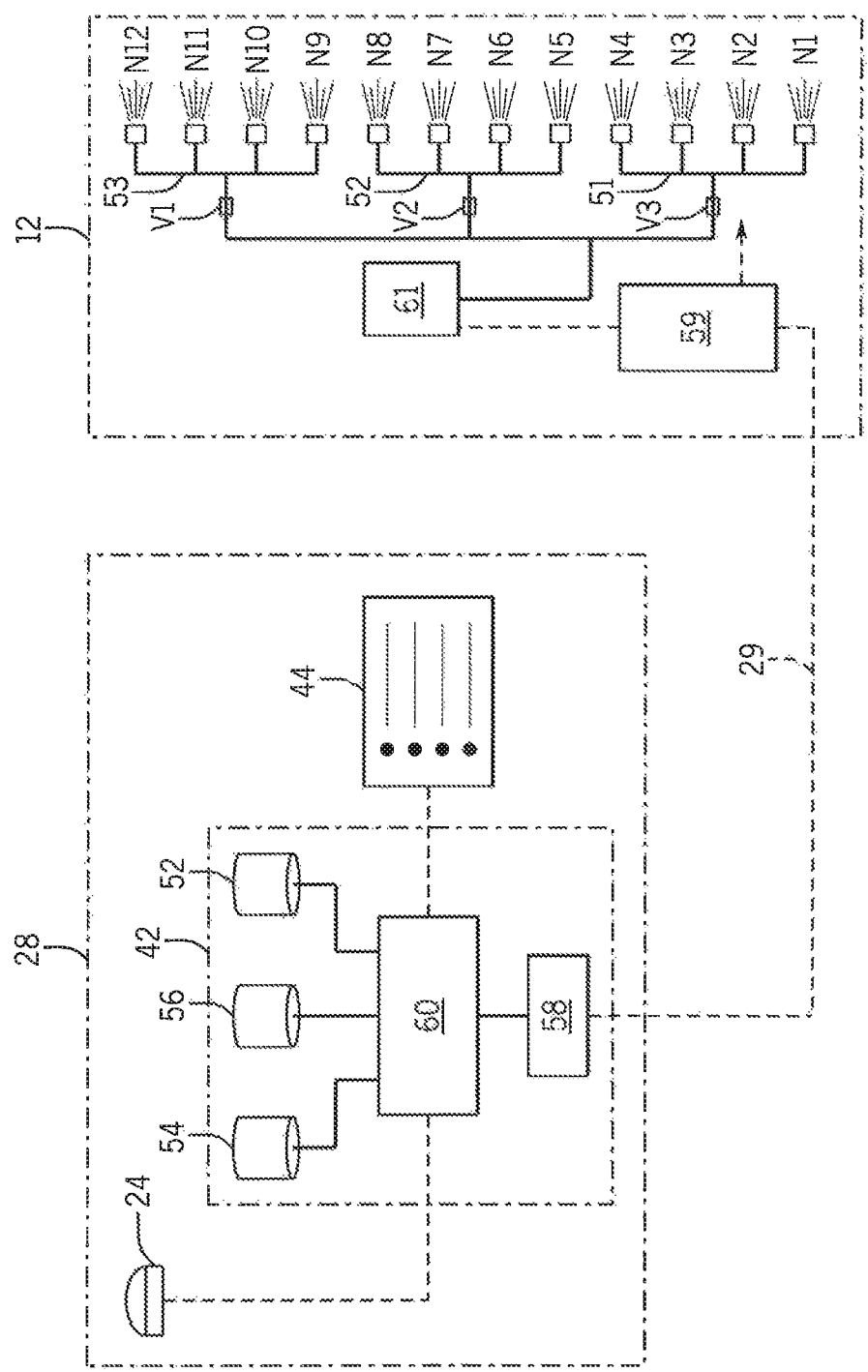
FIG. 4 illustrates a schematic illustration of an exemplary embodiment of an applicator control system, in accordance with an exemplary embodiment of the present invention, operatively connected for controlling a liquid agricultural product applicator.

FIG. 4 shows an exemplary embodiment of the in-cab applicator control system 28 operatively attached to an exemplary embodiment of a liquid agricultural product applicator 12, in accordance with the invention.

The exemplary embodiment of the applicator control system 28 shown in FIG. 4 automatically controls application rates of the agricultural product 18 by an array of spray nozzles N1-N12 arranged into three nozzle sections S1-S3 of the mobile agricultural product applicator 12. The individual application rates are controlled as a function of the GPS coordinated planting data, showing seed placement and coordinating GPS data, recorded at the time of planting a crop of the seed in a field 16. In a preferred embodiment, the nozzles N1-N12 are configured to be electrically remotely controllable so that the flow rate through each of the nozzles N1-N12 can be individually controlled. Similarly, in a preferred embodiment having the twelve nozzles N-N12 grouped into three sections S1-S3, the flow of agricultural product to each of the sections S1-S3 is also individually controllable using a respective corresponding electrically remotely controllable flow control valve V1-V3, so that the flow rate through each of the three sections S1-S3 of groups of nozzles N1-N12 can be individually turned on or off.

As shown in FIG. 4, the exemplary embodiment of the applicator control system 28 includes a controller 42 and a touchscreen 44 mounted in the cab 22 of the tractor 14 or the propulsion vehicle 32, and the GPS receiver 24. The controller 42 is operatively connected to the touchscreen 44 and the GPS receiver 24 for exchanging information and instructions with the touchscreen 42 and GPS receiver 44.

The controller 42 is configured for deriving a present position of the applicator 12 in the field from a signal provided to the controller 42 by the GPS receiver reporting the present position of the tractor 14 or the propulsion vehicle 32. When deriving the present GPS position of the applicator 12 from the present GPS position of the tractor 14 or the propulsion vehicle 32, the controller 42 factors in a correct offset distance 46,48 (see FIGS. 1 and 2), between the GPS receiver 24 on the tractor 14 or the propulsion vehicle 32 and an application axis or plane 50 for each of the nozzles N1-N12.

As further shown in FIG. 4, the controller 42 of the exemplary embodiment of the application control system 28 includes a planting data storage register 52, an application rate storage register 54, an application parameter storage register 56, an input output (I/O) arrangement 58, and a processor 60. The processor 60 is operatively inter-connected for exchanging information between the GPS receiver 24, the planting data storage register 52, the application rate storage register 54, the application parameter storage register 56, the touchscreen 44 and the I/O arrangement 58.

The planting data storage register 52 is configured for receiving and storing GPS coordinated planting data that was recorded at the time of planting the crop in the field 16. The application rate data storage register 54 is configured for storing a prescription generated by the processor 60 that includes instructions for controlling the agricultural product applicator 12 as a function of the current position and speed of the applicator 12 in the field 16. The current speed of the applicator 12 may be calculated from successive present GPS positions reported by the GPS receiver, or may be supplied as a signal input to the processor from the tractor 14 or propulsion vehicle 32. The application parameter data storage register 56 is configured for receiving and storing application parameters related to preparing the application rate data instructions of the prescription from the planting data. The input/output (I/O) arrangement is adapted for exchanging information with the applicator 12 through the data bus 29.

As previously noted, for embodiments of the invention where the same propulsion vehicle is used for pulling the planter 36 and the applicator 12, as illustrated in FIGS. 1 and 3, the GPS coordinated planting data may be readily transferred directly form the on-board computer 38 to the planting data storage register 52. Where different propulsion vehicles are used for pulling the planter 36 and moving the applicator 12 across the planted field 16, the GPS coordinated planting data is transferred from the on-board computer 38 to the planting data register 52 using Internet or wireless means, or through use of conventional transportable physical electronic memory devices (not shown).

The processor 60 is configured for processing the GPS coordinated planting data in accordance with instructions stored in the application parameter data storage register 56, to generate a prescription including a set of instructions linked to the GPS coordinated planting data in the application rate data register 52. The resulting prescription is then stored in the application rate data storage register 54. The processor 60 is further configured for supplying the application instructions to the applicator 12 via the I/O arrangement 58 and the data bus 29 as a function of the present position of the applicator 12 in the field 16.

As further illustrated in FIG. 4, the data bus 29 is operatively connected to an applicator controller 59. The applicator controller 59 is in turn operatively connected to a liquid agricultural product supply arrangement 61 that supplies the liquid agricultural product to the three sections S1-S3 and their respective groups of nozzles N1-N12, via the three section control valves V1-V3. The applicator controller 59 is configured and operatively connected to the liquid agricultural product supply arrangement 61, the three valves V1-V3, and each of the individual nozzles N1-N12 for controlling each of those elements in accordance with the application instructions supplied to the applicator 12 via the I/O arrangement 58 and the data bus 29 as a function of the present position of the applicator 12 in the field 16.

In the exemplary embodiment of the control system 28, the touchscreen is used as the primary means for entering and modifying the application parameter data used by the processor 60 for generating the prescription from the cab 22 of the tractor 14 or the self-propelled propulsion vehicle 32. These entries are provided through the touchscreen 42 both prior to beginning application of the agricultural product 18 to the field 16, and as on-the-fly modifications of the prescription during application of the agricultural product 18 to the field 16.

The controller 42 and the touchscreen 44 are configured such that, at any time, an application map (see FIG. 6) visually representing the present prescription can be pulled up for viewing.

The initial entries and modifications of application parameters via the touchscreen differ from mere manual adjustments to a specific application rate of one or more of the nozzles N1-N12 or sections S1-S3, in that the application parameters are data sets or scaling instructions that are automatically carried out by the processor 60 without requiring further input from the operator.

Figure 5:
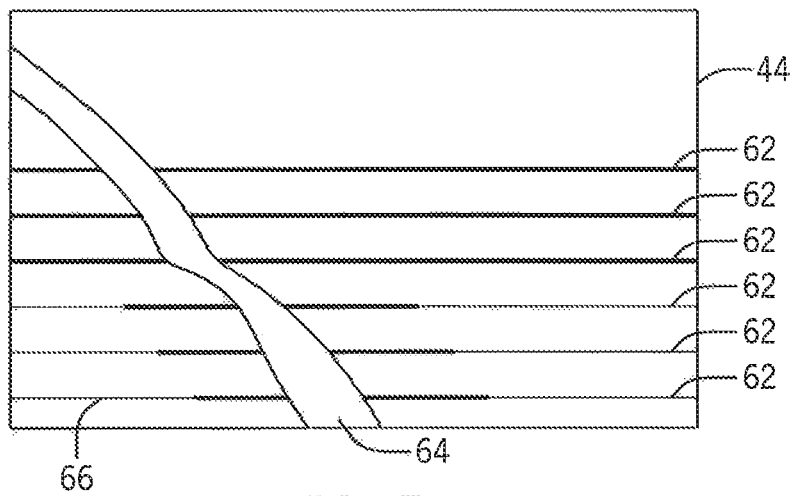
FIG. 5 illustrates a representation of a display on a touchscreen of the control system of FIG. 4, displaying the GPS coordinated planting data recorded during planting of the crop in the manner depicted in FIG. 3, in accordance with an exemplary embodiment of the present invention.

To illustrate this difference, FIG. 5 shows the touchscreen 44 displaying an exemplary image of the GPS coordinated planting data recorded at the time of planting the field 16. The display shows a portion of the field 16 where multiple parallel rows 62 were planted across a waterway 64. The planter 36 selectively shut off its individual row planting units while traversing the waterway 64, and then selectively resumed planting in its individual row planting units in such a manner that no seed was planted in the waterway 64. The display further shows that, for some reason, after crossing the waterway, one of the rows 62 had an unplanted length 66.

The thinner lines representing the rows 62 indicate planting of a first variety of seed at a first population rate. The broader lines representing the rows 62 show lengths of the rows where the planter changed to one or more different seed varieties, and/or where the planter changed to one or more different population rates. In the actual display, different colors or indicia on the display may be used to display all of the variations in seed variety and population that were incorporated by the planter 36 as it was planting the field 16.

It will be appreciated that with all of these variations occurring over a dozen rows or more, and particularly within each of the rows, it would be a practical impossibility for an operator to manually adjust the application rate of each nozzle N1-N 12 or each section S1-S3 to accommodate all of these variations in the GPS coordinated planting data representing the actual placement, population and variety of seed planted in the multiple rows 62. The impossibility of having the operator make enough manual adjustments on-the-fly to accommodate such a complex planting arrangement will be even more appreciated when it is realized that an actual spray boom of an applicator may extend over a 140-foot wide swath of the field 16 in each pass over the field by the applicator 12, and thus potentially be simultaneously applying agricultural product 18 to sixty or seventy rows 62, rather than the six rows shown in FIG. 4, using many more than the twelve nozzles N1-N12 and three sections S1-S3 of the exemplary embodiment of the applicator 12 described herein.

Figure 6:
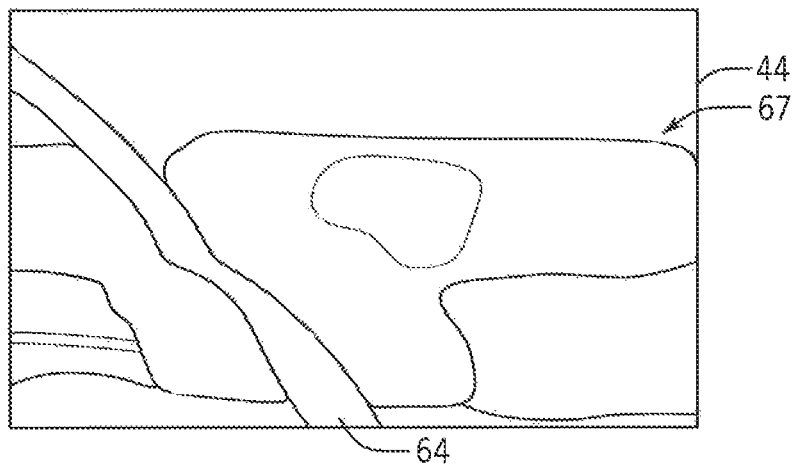
FIG. 6 illustrates a representation of a display on the touchscreen of the control system of FIGS. 4 and 5, displaying a prescription generated from the planting data displayed in FIG. 5, in accordance with an exemplary embodiment of the present invention, for application of the agricultural product.

As previously noted, the controller 42 and the touchscreen 44 are configured such that, at any time, an application map visually representing the present prescription can be pulled up for viewing. FIG. 6 shows such an application map 67 of a prescription generated by the controller 42 for applying the agricultural product 18 to the field 16 shown in FIG. 5, in accordance with the GPS coordinated planting data recorded at the time of planting the field 16. The displayed map 67 delineates various application rates as areas having irregular boundaries, which may be displayed in different colors or variously marked with indicia to facilitate visualization of the prescription.

Figure 7:
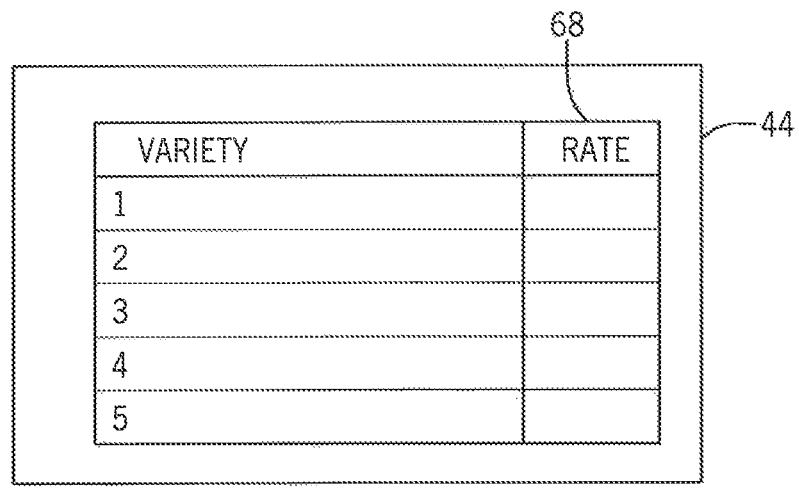
FIG. 7 illustrates a representation of a display on the touchscreen of the control system of FIGS. 4-6, displaying a table for on-the-fly entry and/or modification of application rates for different varieties of seed, via the touchscreen, of the prescription generated from the planting data displayed in FIG. 5, in accordance with an exemplary embodiment of the present invention.

As illustrated in FIG. 7, the application parameters stored in the application parameter storage register 56, of the exemplary embodiment of the control system 28, include a parameter for selecting an application rate of the agricultural product 18 as a function of the variety of seed planted. The processor 42 and touchscreen 44 are configured such that application rates for multiple varieties of seed are entered into the application parameter data set stored in the application parameter data register 56, via entry into a table 68 displayed on the touchscreen 44.

Those having skill in the art will recognize that having the ability to change inputs to the variety/rate table on-the-fly through the touchscreen 44 provides a substantial advantage over prior application rate control system approaches. For example, if the operator should observe, prior to entry into the field or during application of the agricultural product, that, for some reason, some or all of the seed planted for a particular variety of seed has failed to emerge and grow, the operator can pull up the variety/rate table 68 on the touchscreen and reduce the application rate proportionately for the problematic variety to avoid wasteful excess application of the agricultural product 18 in areas of the field 16 that are not producing the plant growth that was anticipated at the time the field was planted.

Once the variety/rate table 68 has been modified in this manner, the application control system 28 will automatically modify the prescription and instructions sent to the applicator 12, so that the operator does not need to continually enter manual instructions each time the troublesome variety is encountered.

In similar fashion, the application parameters stored in the application parameter storage register 56, of the exemplary embodiment of the control system 28, include a parameter for selecting an application rate of the agricultural product 18 as a function of the population of seed planted. The processor 42 and touchscreen 44 are configured such that correct application rates for differing populations of seed are automatically commanded, as the applicator moves across the field 16.

In some embodiments of the control system 28, desired application rates for multiple discrete planted population rates are entered into the application parameter data set stored in the application parameter data register 56 via entry into a table displayed on the touchscreen 44, in the manner described above with reference to the variety/rate table 68.

Figure 8:
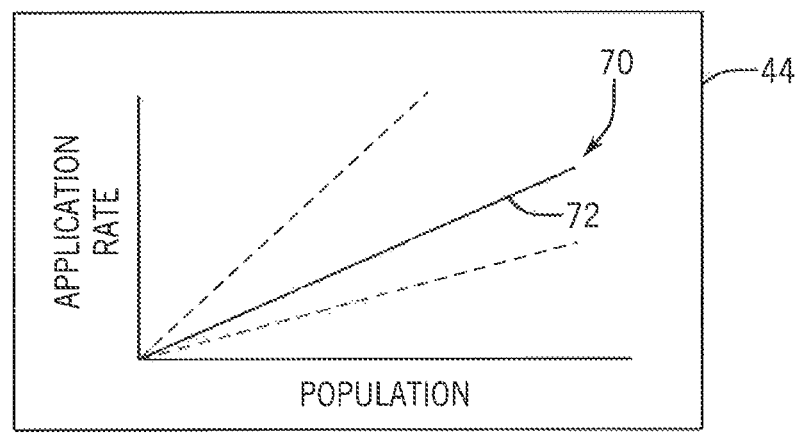
FIG. 8 illustrates a representation of a display on the touchscreen of the control system of FIGS. 4-6, displaying a graph for on-the-fly entry and/or modification of application rates for different populations of seed, via the touchscreen, of the prescription generated from the planting data displayed in FIG. 5, in accordance with an exemplary embodiment of the present invention.

Alternatively, an application parameter in the form of an equation for calculating or interpolating a scaled application rate, as a function of the planted population rate, is stored in the application parameter data registry 56, so that population/rate adjustments are not limited to pre-determined discrete options. A graph 70 showing a curve representing a present scaled population/rate application parameter resulting from use of the equation stored in the application parameter data registry can be displayed on the touchscreen 44, as illustrated in FIG. 8. The operator may then use the touchscreen 44 to modify the curve 72, to thereby conveniently modify the equation and resulting automatic adjustments by the control system 28 in accordance with the population/rate parameter.

Those having skill in the art will recognize that having the ability to change inputs to the population/rate table or graph, on-the-fly, through the touchscreen 44, provides a substantial advantage over prior application rate control system approaches. For example, if the operator should decide, prior to entry into the field or during application of the agricultural product, that the population/rate relationship needs to be changed for some reason, such as standing population rates being different than expected at the time of planting, or higher or lower incidence of invasive plants or insects in areas of the field planted with a particular plant population, the operator can pull up the population/rate table or graph 70 on the touchscreen and modify the population/rate parameter accordingly for the problematic population rate, and store the modified parameter in the application parameter data storage register 56, to automatically avoid over or under application of the agricultural product 18 in the affected areas of the field 16.

Once the population/rate parameter has been modified in this manner, the application control system 28 will automatically modify the prescription and instructions sent to the applicator 12, so that the operator does not need to continually enter manual instructions each time a troublesome population area of the field 16 is encountered.

Figure 9:
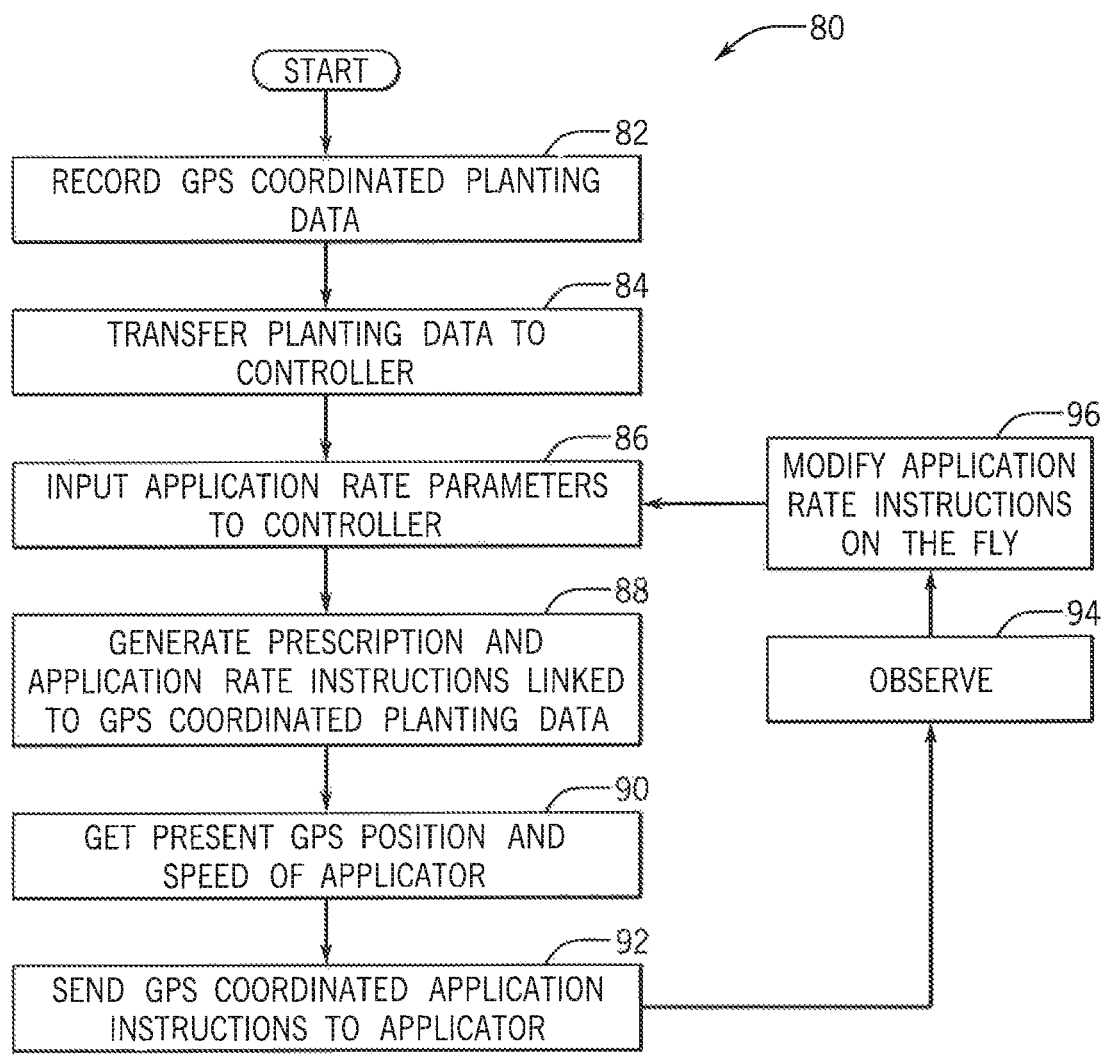
FIG. 9 illustrates a block diagram of a method, in accordance with an exemplary embodiment of the present invention.

FIG. 9 shows an exemplary embodiment of a method 80, in accordance with the invention, with reference to the exemplary embodiments of the application apparatuses 10,30 and applicator control system 28 described above.

As shown at block 82, at the time of planting the field 16, GPS coordinated planting data is recorded. This data includes information such as row and seed placement location, where different varieties of seed are planted, and the population of seeds along the length of each planted row, in addition to any unplanted areas of the field 16.

The GPS coordinated planting data is then transferred to the planting data register 52 in the controller 42 of the applicator control system 28, as shown at block 84.

The application parameters are then entered into the application parameter data register 56 of the controller 42 in the applicator control system 28 via the touchscreen 44, as shown in block 86.

The controller 28 then uses the application parameters stored in the application parameter data register to generate the present product application prescription from the GPS coordinated planting data stored in the planting data register 52, and it stores the generated present application prescription in the application rate data storage register 54 in the controller 42 of the applicator control system 28, as shown in block 88.

As shown at block 90, the controller 42 then acquires a present position signal from the GPS receiver 24 and, using the appropriate offset 46,48, computes a present GPS position of the applicator 12. As further shown in block 90, the controller 42 also either computes a present speed of the applicator 12 from successive GPS position signals, or it acquires present speed of the applicator 12 from the application apparatus 10,30.

Using the present prescription, the present position of the applicator 12, and the present speed of the applicator, the processor 60 of the controller 42 generates signals for controlling the application of the agricultural product 18 by the applicator 12, which are communicated to the applicator controller 59 via the I/O arrangement 58 of the controller 42 of the control system 28 and the data bus 29 connecting the control system 28 to the applicator 12, in the manner shown in block 92.

As shown in block 94, prior to beginning application in the field, or during application of the agricultural product 18 to the field, the operator observes the field and the crop in the field to ascertain whether the initial prescription generated from the GPS coordinated planting data that was recorded at the time of planting the field 16 should be modified.

If the operator determines that modifications are desirable and/or necessary, the operator uses the touchscreen 44 to modify the parameters stored in the application parameter data storage register 56. These modifications of the application parameters are provided as inputs to block 86, and the controller 42 uses the modified parameters to update the initial prescription and generate a new present prescription. The new present prescription is then automatically implemented by the control system 28 for controlling application of the agricultural product applicator 12, without the need for further manual adjustment of the prescription by the operator.

Those having skill in the art will readily recognize that the above described control system, application apparatus and method provide considerable advantages over prior systems, apparatuses and methods for controlling the application of an agricultural product. It will also be appreciated and understood that, although the exemplary embodiments described herein were directed to an applicator applying a liquid agricultural product, it is contemplated that the invention may be used with efficacy in other embodiments for applying a dry agricultural product.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but it is intended to include all changes and modifications that are within the scope and spirit of the invention.

What is claimed is:

1. An in-cab applicator control system for automatically controlling an application rate of an agricultural product by a mobile agricultural product applicator as a function GPS coordinated planting data showing seed placement and GPS data recorded at the time of planting a crop of the seed in a field, the system comprising:
    a controller and a touchscreen mountable in the cab of a propulsion vehicle configured for moving the applicator across a planted field; and
    a GPS receiver operatively connected for providing a present position of the applicator to the controller;
    the controller being operatively connected to the touchscreen and the GPS receiver for exchanging information and instructions with the touchscreen and GPS receiver;
    the controller and touchscreen being configured for automatically generating and modifying an application prescription and related instructions for controlling the applicator on-the-fly during application of the agricultural product, from the GPS coordinated planting data gathered at the time of planting, in accordance with application rate modification parameters stored in the controller, to thereby automatically vary application rates of the agricultural product being applied by the applicator in accordance with the prescription as the applicator is moved across the field by the propulsion vehicle.

2. The control system of claim 1, wherein at least one application parameter is provided in the cab using the touchscreen.

3. The control system of claim 1, wherein at least one application parameter is modifiable on-the-fly using the touchscreen.

4. The control system of claim 1, wherein the parameters include at least one parameter from a list of parameters consisting of: a parameter relating to adjustment of the application rate the of agricultural product to correspond with a desired application rate specific to each of at least two different seed varieties; and, a parameter relating to adjustment of the application rate the of agricultural to correspond with a desired application rate specific to each of at least two different population rates of planted seed.

5. The control system of claim 1, wherein:
    the controller includes a planting data storage register for receiving and storing GPS coordinated planting data recorded at the time of planting the crop, an application rate data storage register for storing a prescription including instructions for controlling the agricultural product applicator as a function of the current position of the applicator in the field, an application parameter data storage register for receiving and storing application parameters related to preparing the application rate data instructions from the planting data, an input/output (I/O) arrangement adapted for exchanging information with the applicator, and a processor operatively connected for exchanging information between the GPS receiver, the planting data storage register, the application rate storage register, the application parameter storage register, the touchscreen and the I/O arrangement;
    the processor being configured for processing the GPS coordinated planting data in accordance with instructions stored in the application parameters data storage register and storing a set of application instructions linked to the GPS coordinated planting data in the application rate data register;
    the processor also being configured for providing a visual display of the set of application instructions and the present position of the applicator on the touchscreen;
    the processor being further configured for supplying the application instructions to the applicator via the I/O arrangement as function of the present position of the applicator.

6. The control system of claim 5, wherein the application parameters stored in the application parameter storage register include a parameter for selecting an application rate of the agricultural product as a function of the variety of seed planted.

7. The control system of claim 6, wherein the processor and touchscreen are configured such that application rates for two or more varieties of seed are entered via the touchscreen into a table in the application parameter data register.

8. The control system of claim 5, wherein the application parameters stored in the application parameter storage register include a parameter for selecting an application rate of the agricultural product as a function of the seed population rate.

9. The control system of claim 8, wherein the processor and touchscreen are configured such that application rates for two or more seed population rates are entered into a table stored in the application parameter data register.

10. The control system of claim 9, wherein the application rates for the two or more seed population rates are entered into the table via the touchscreen.

11. The control system of claim 9, wherein the processor is configured for computing an application rate as a function of a seed population rate of the planting data in accordance with a scaling equation stored in the application rate parameter data register.

12. A mobile agricultural product application apparatus for applying an agricultural product to a field at an application rate according to an application rate prescription generated on-the-fly by the application apparatus from GPS coordinated planting data recorded at the time of planting a crop in the field, the agricultural product application apparatus comprising:
    an applicator adapted for operative connection to a propulsion vehicle configured for operatively moving the applicator across the field during application of the agricultural product by the applicator; and
    an applicator control system operatively connected to the applicator for supplying operating commands to the applicator for controlling the application rate of the agricultural product in accordance with the prescription generated on-the-fly as the applicator is moved across the field;
    the applicator control system including a controller and a touchscreen that are mountable in a cab of the propulsion vehicle and a GPS receiver operatively connected for providing a present position of the applicator to the controller;

the controller being operatively connected to the touchscreen and the GPS receiver for exchanging information and instructions with the touchscreen and GPS receiver;

the controller and touchscreen being configured for generating and storing the application prescription and related commands on-the-fly from the GPS coordinated data gathered at the time of planting, in accordance with application rate parameters stored in the controller.

13. The mobile agricultural product application apparatus of claim 12, wherein one or more application parameters stored in the controller are provided from the cab using the touchscreen.

14. The mobile agricultural product application apparatus of claim 12, wherein one or more of the application parameters stored in the controller are modifiable on-the-fly using the touchscreen.

15. The mobile agricultural product application apparatus of claim 12, wherein the parameters stored in the controller include at least one parameter from the list of parameters consisting of: a parameter relating to adjusting the application rate the of agricultural product to correspond with a desired application rate specific to each of at least two different seed varieties; and, a parameter relating to adjusting the application rate the of agricultural product to a rate corresponding to a desired application rate for each of at least two different population rates of planted seed.

16. The mobile agricultural product application apparatus of claim 12, wherein:

the controller includes a planting data storage register for receiving and storing the GPS coordinated planting data recorded at the time of planting the crop in the field, an application rate data storage register for storing instructions for controlling the agricultural product applicator, an application parameter data storage register for receiving and storing application parameters related to preparing the application rate data instructions of the prescription from the planting data, an input/output (I/O) arrangement adapted for exchanging information with the applicator, and a processor operatively connected for exchanging information between the GPS receiver, the planting data storage register, the application rate storage register, the application parameter storage register, the touchscreen and the I/O arrangement;

the processor being configured for processing the planting data in accordance with parameters stored in the application parameters data storage register to generate the prescription and storing a set of application instructions of the prescription linked to the GPS information of the planting data in the application rate data register;

the processor also being configured for providing a visual display of the set of application instructions and the present position of the applicator on the touchscreen;

the processor being further configured for supplying the application instructions to the applicator via the I/O arrangement as function of the present position of the applicator.

17. The mobile agricultural product application apparatus of claim 12, wherein the applicator includes two or more individually controllable product application nozzles and the application rate prescription generated by the controller from the planting data and provided to the applicator through the I/O arrangement includes instructions for individually controlling each of the two or more individually controllable product application nozzles.

18. The method of claim 17, wherein:

the controller includes a planting data storage register for receiving and storing the GPS coordinated planting data recorded at the time of planting the crop in the field, an application rate data storage register for storing instructions for controlling the agricultural product applicator, an application parameter data storage register for receiving and storing application parameters related to preparing the application rate data instructions of the prescription from the planting data, an input/output (I/O) arrangement adapted for exchanging information with the applicator, and a processor operatively connected for exchanging information between the GPS receiver, the planting data storage register, the application rate storage register, the application parameter storage register, the touchscreen and the I/O arrangement;

the processor is configured for processing the planting data in accordance with parameters stored in the application parameters data storage register to generate the prescription and storing a set of application instructions of the prescription linked to the GPS information of the planting data in the application rate data register;

the processor is also configured for providing a visual display of the set of application instructions and the present position of the applicator on the touchscreen;

the processor is further configured for supplying the application instructions to the applicator via the I/O arrangement as function of the present position of the applicator; and the method further includes storing the GPS coordinated planting data in the planting data storage register, storing at least one application parameter in the application parameter data storage register, generating and storing the application instructions of the prescription in the application rate storage register, providing a visual display on the touchscreen, and supplying the application instructions to the applicator via the I/O arrangement as function of the present position of the applicator.

* * * * *